United States Patent [19]

Rather et al.

[11] Patent Number: 5,347,740
[45] Date of Patent: Sep. 20, 1994

[54] MULTI-FUNCTIONAL VARIABLE POSITION RIFLE AND CAMERA MOUNT

[76] Inventors: Lewis L. Rather; Brenda L. Rather, both of 6104A Parkwood Dr., Austin, Tex. 78735; Larry W. Mobley, HCO Rt. 3 Box 81J, Spicewood, Tex. 78669

[21] Appl. No.: 898,830

[22] Filed: Jun. 15, 1992

[51] Int. Cl.⁵ ............................................. F41A 23/02
[52] U.S. Cl. ............................. 42/94; 89/40.06; 354/81
[58] Field of Search ............... 42/94; 89/37.03, 37.04, 89/40.06; 346/38; 354/81, 293

[56] References Cited

U.S. PATENT DOCUMENTS

| | | | |
|---|---|---|---|
| 1,547,295 | 7/1925 | Bull | 89/40.06 |
| 2,282,680 | 5/1942 | Sonne | 354/81 |
| 2,441,874 | 5/1948 | Evans | 89/37.03 |
| 2,664,797 | 1/1954 | Thrasher | 354/81 |
| 3,022,898 | 2/1962 | Loeb | 42/94 |
| 4,393,614 | 7/1983 | Pickett | 42/94 |
| 4,876,814 | 10/1980 | Lombardo | 42/94 |
| 4,913,391 | 4/1990 | Klipp | 42/94 |
| 4,937,965 | 7/1990 | Narvaez | 42/94 |
| 5,060,410 | 10/1991 | Mueller | 42/94 |
| 5,073,788 | 12/1991 | Lingwall | 354/81 |

FOREIGN PATENT DOCUMENTS

| | | | |
|---|---|---|---|
| 3629843 | 6/1987 | Fed. Rep. of Germany | 42/94 |
| 499816 | 2/1920 | France | 89/37.04 |
| 861284 | 2/1940 | France | 42/94 |
| 211677 | 1/1941 | Switzerland | 89/37.03 |
| 102161 | 11/1916 | United Kingdom | 89/40.06 |
| 129679 | 7/1919 | United Kingdom | 89/40.06 |

Primary Examiner—Stephen C. Bentley
Attorney, Agent, or Firm—Joseph F. Long

[57] ABSTRACT

A combination of a camera mount and a gun mount allowing horizontal, vertical and positional adjustment with manually activated locking knobs allowing comfortable multidirectional shooting with a gun that may be rigidly clamped in any one of a multiplicity of rapidly adjustable positions and with the camera adjustably mounted allowing a hunter to take a picture instead using the gun.

6 Claims, 6 Drawing Sheets

MULTI-FUNCTIONAL VARIABLE POSITION RIFLE AND CAMERA MOUNT

BACKGROUND OF THE INVENTION

In this country the hunting sport continues to grow along with the population of some larger game such as deer. With eradication of screw worm and hunting of deer largely limited to harvesting of bucks or male deer, the deer population not only grows in one locality but continues to spread. Individual hunters are normally limited to harvesting no more than two bucks in one season and therefore frequently enjoy seeing but not shooting a particular buck while waiting for a larger or trophy animal.

There is a desire to aid the hunter in making certain that he makes a clean kill and does not wound the animal. There is also a desire on the part of many hunters to be able to take pictures of various animals that he sees but is not hunting or does not wish to shoot. A hunter sitting quietly in a hunting stand sees and enjoys seeing a wide variety of animals.

The multi-functional variable position rifle and camera mount fills the desire of the hunter not only to make almost perfect shots, but also to take pictures instead of shooting. A secondary function of the device is to allow adjusting the scope or telescopic sights on a rifle before hunting by calibrating or adjusting the scope for a distance as chosen by the hunter. Most commonly, the telescopic sights on larger rifles are calibrated to hit a bulls eye on a target at 100 or 200 yards. Many minor mechanical details may be easily changed in the invention as described and we wish to be limited only to the general purpose and description in these claims, drawings, and specifications.

SUMMARY OF THE INVENTION

The objective of this invention includes:
a) having a mounting beam for a rifle and/or a camera with a clamp or mounting device suitable for rigid attachment to a hunting stand or hunting vehicle and with movable mechanism to allow a hunter to comfortably aim and rapidly lock the rifle or camera in any one of many positions.
b) having a rifle mount allowing both surveying and horizontal adjustment that may slide into a holder with extensible legs with the holder sized to be carried in a hunter's pocket.
c) having clamping mechanisms that allow rapid clamping of the rifle and the movable parts of the device in a fixed position thereby allowing essentially perfect shooting. The preferred embodiment of the invention may be described as five major components. These are:
1) a rifle and camera mounting beam with means to adjustably fasten a rifle and/or camera to the mounting beam.
2) a cylindrical mounting post that pivotally attaches to the mounting beam and has a locking device to lock the beam in a desired position and a slidable collar that may be locked in position on the mounting post;
3) an outer mounting open cylinder attached at right angles to a cylindrical side arm or horizontal positioning arm; the outer mounting cylinder being sized to closely but slidably fit over the cylindrical mounting post with the sliding collar on the cylindrical mounting post being used to adjust the vertical height of the gun mounting beam above the outer mounting open cylinder and allowing the mounting post to be rotated in the outer mounting open cylinder;
4) a tee shaped mounting piece comprising an open cylinder sized to closely but slidably fit the horizontal positioning arm and attached at right angles to a cylindrical pivot post.
5) a U shaped clamp with a threaded thumb screw or similar locking device in one leg of the U shaped clamp to allow the clamp to move easily and be fastened rigidly to a rail such as found in a deer blind or as may be installed on a vehicle and an open inner mounting cylinder attached to the other leg of the U shaped clamp; the open inner mounting cylinder is sized to closely but slidably fit over the cylindrical pivot post of the tee shaped mounting piece.

To assemble for use the U shaped clamp with the open inner mounting cylinder is clamped to a rail or horizontal support piece. The cylindrical pivot post of the tee shaped mounting piece is slipped into the inner open mounting cylinder. The horizontal positioning arm or side arm of the outer mounting cylinder is slipped into the horizontal open cylinder of the tee shaped mounting piece. The cylindrical mounting post, which is attached to the mounting beam, is slipped into the outer mounting cylinder and the rifle and/or camera are fastened to the mounting beam. All pieces may be rigidly attached to each other by tightening thumb screws or similar locking devices in the inner mounting cylinder, the open cylinder holding the positioning arm and the inner mounting cylinder. The mounting beam may be held horizontal with a threaded locking device in the cylindrical mounting post. With the mount assembled as indicated a hunter may adjust the vertical height of the mounting post. The hunter may then move the gun in a natural movement and lock the gun or camera in a given position as he wishes. The many different positions are made possible because the side armor positioning arm can both pivot and slide in or out thereby allowing a range of positions of the inner mount that allows the rifle to be pivoted while the pivotal connection between the rifle mount allows tilting the rifle to make either a very close or long shot. Further flexibility is attained by installing one or more roller bearings in the short section of the U shaped clamp thereby allowing the clamp to move easily on a support rail before clamping rigidly to the support rail.

We've described a preferred embodiment of the unit as made essentially from sections of open pipe; however, one skilled in the art could make mechanical modifications to allow similar clamping and movement of the rifle and camera, we therefore do not wish to be limited to exact details, but only as to general spirit and purpose as outlined in these claims and specifications.

DETAILED DESCRIPTION OF THE DRAWING

A preferred embodiment of the invention may best be described by reference to the drawings.

Figure 1:
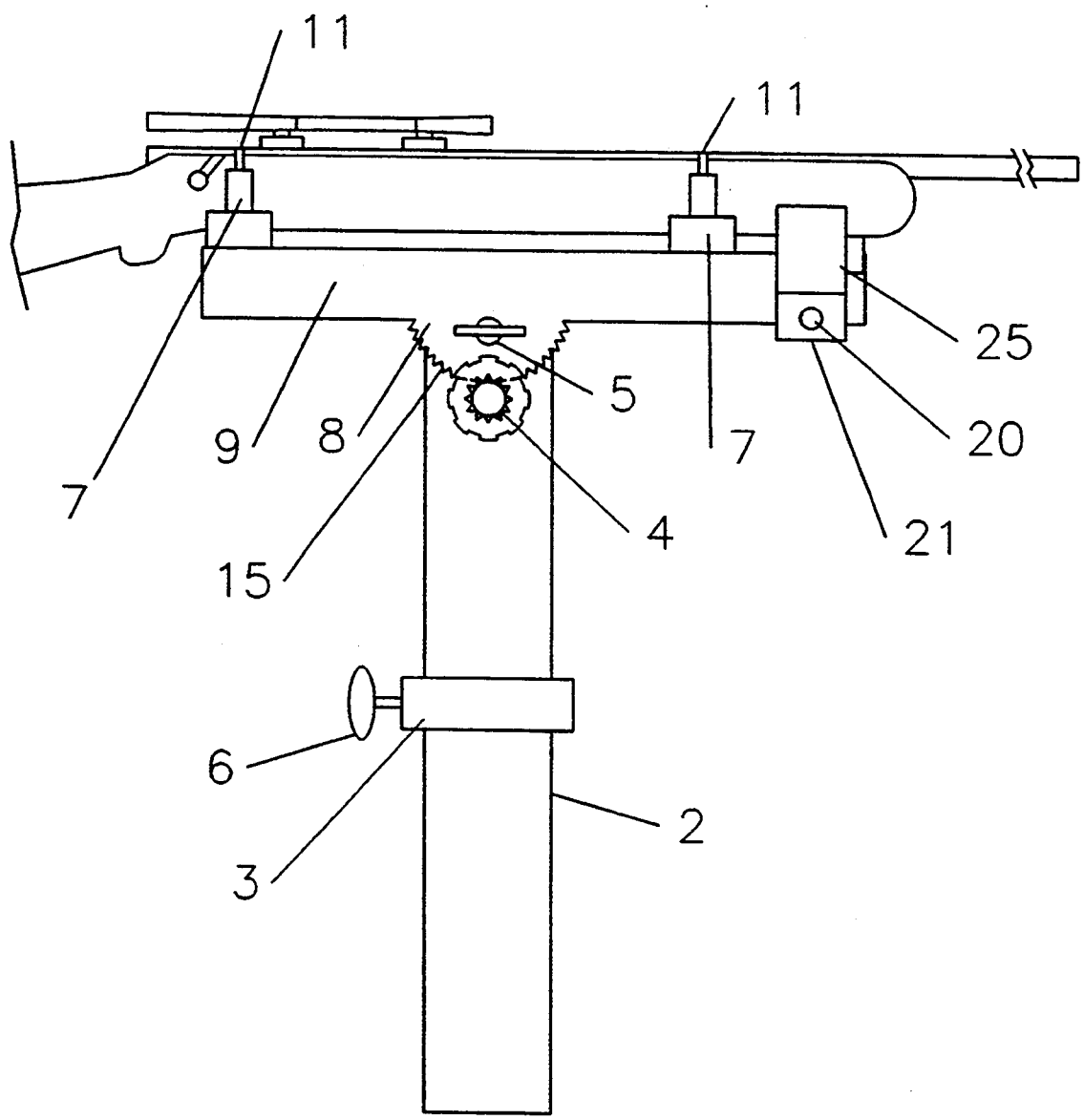
FIG. 1 shows a rifle and camera attached to a rifle mount beam which is pivotally attached to cylindrical mounting post.
Figure 6:
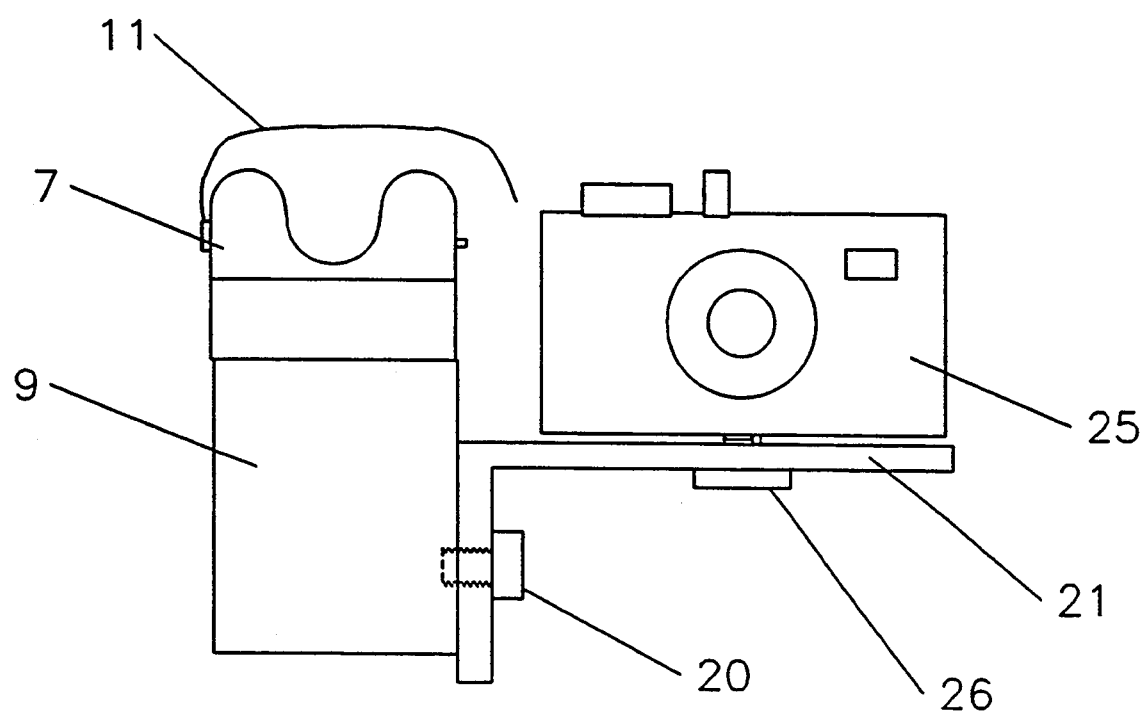
FIG. 6 shows a camera and camera mount attachable to the rifle mount beam.

In FIG. 1 we show a rifle 1 held in mounting units 7 with tie down straps 11 that conveniently may be made from Velcro TM. The mounting units 7 may be attached to the mounting beam 9 which has a U shaped cross section as shown in FIG. 6. Also removably attached to mounting beam 9 is camera mount unit 20. The pivot locking knob 21 may be used to hold the mounting unit 20 with camera 25 to the beam 9 in an adjustable fashion.

A pivotal or horizontal adjustment connector 8 is pivotally connected to cylindrical post 2 with a threaded locking pivot pin 5. An adjustment knob 4 with gear teeth meshing with gear teeth 15 on adjustment connector 8 as shown in more detail in FIG. 5 may be adjusted to firmly but movably hold mount 9 and locking pivot pin 5 can be further tightened to hold mount 9 quite rigidly at a desired position.

Figure 2:
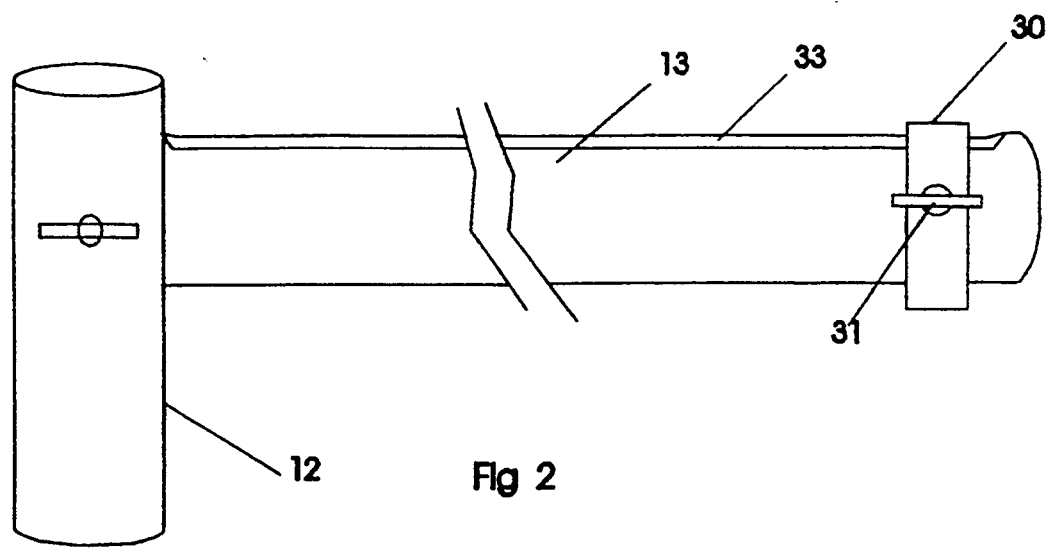
FIG. 2 shows a tee shaped piece comprising an outer cylinder holder to rotatably hold the cylindrical mounting post with the outer cylinder holder having positioning arm or side arm attached thereto.

A slidable collar 3 with a position locking thumbscrew 6 may be moved and locked in position to adjust the vertical height of beam 9 when the cylindrical mounting post 2 is slipped into outer mounting cylinder 12, as shown in FIG. 2.

Figure 3:
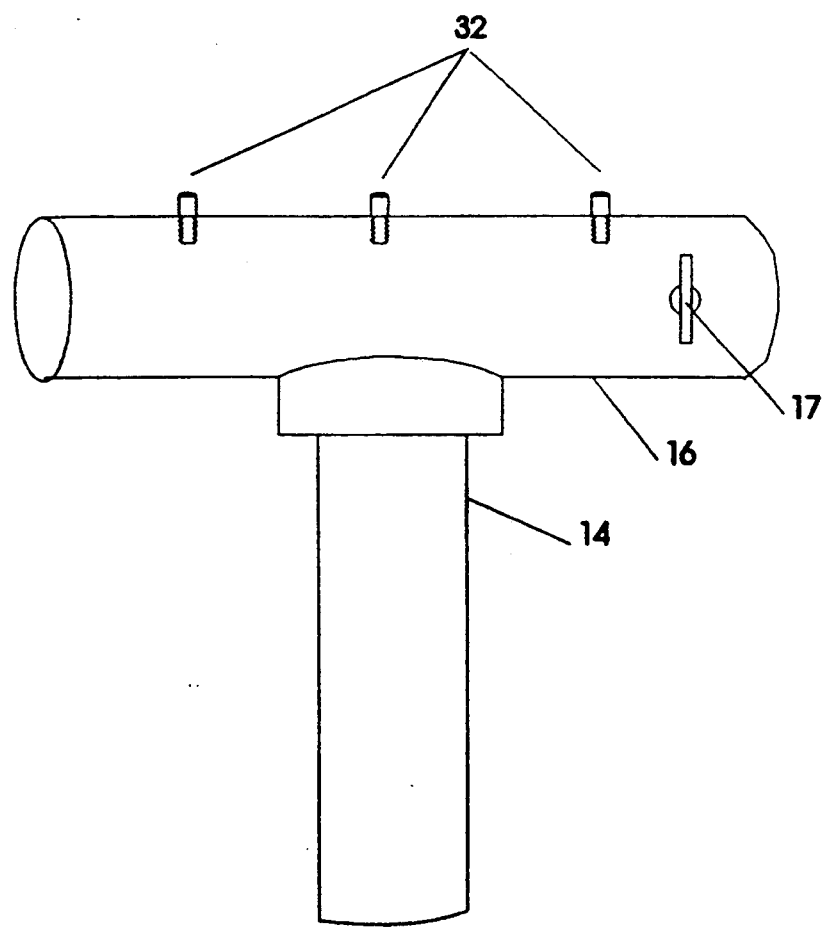
FIG. 3 shows a positioning armholder to slidably fit over the positioning arm and a cylindrical post attached at right angles to the positioning arm holder.

FIG. 2 shows the tee shaped open cylindrical outer mount holder 12 and a side arm 13 with slot 33 which acts to hold the open cylindrical mount 12 in a vertical position as side arm 13 slides into side arm holder 16, FIG. 3, with slot 33 fitting closely around guide pins 32, FIG. 3. The side arm 13 is sized to fit closely but to slide easily in side arm holder 16, FIG. 3. Locking ring 30 is held in place with a threaded thumb screw 31 to prevent arm 31 from disengaging from side arm holder 16.

In FIG. 3 we show side arm holder 16 rigidly attached at right angles to a cylindrical post 14. Cylindrical post 14 is sized to fit closely but rotatably in the inner cylindrical holder 19, FIG. 4. Thumbscrew 35 may be used to lock cylindrical post 14 in position when desired.

In one preferred embodiment post 2, FIG. 1, cylindrical holder 12, FIG. 2, cylindrical post 14, FIG. 3, and inner cylindrical holder 19 all may be approximately 12" long and ¾ to 2 inches in diameter. Side arm 13 is preferably about 18 to 24 inches long with side arm holder 16 being 6" to 12" in length.

Figure 4:
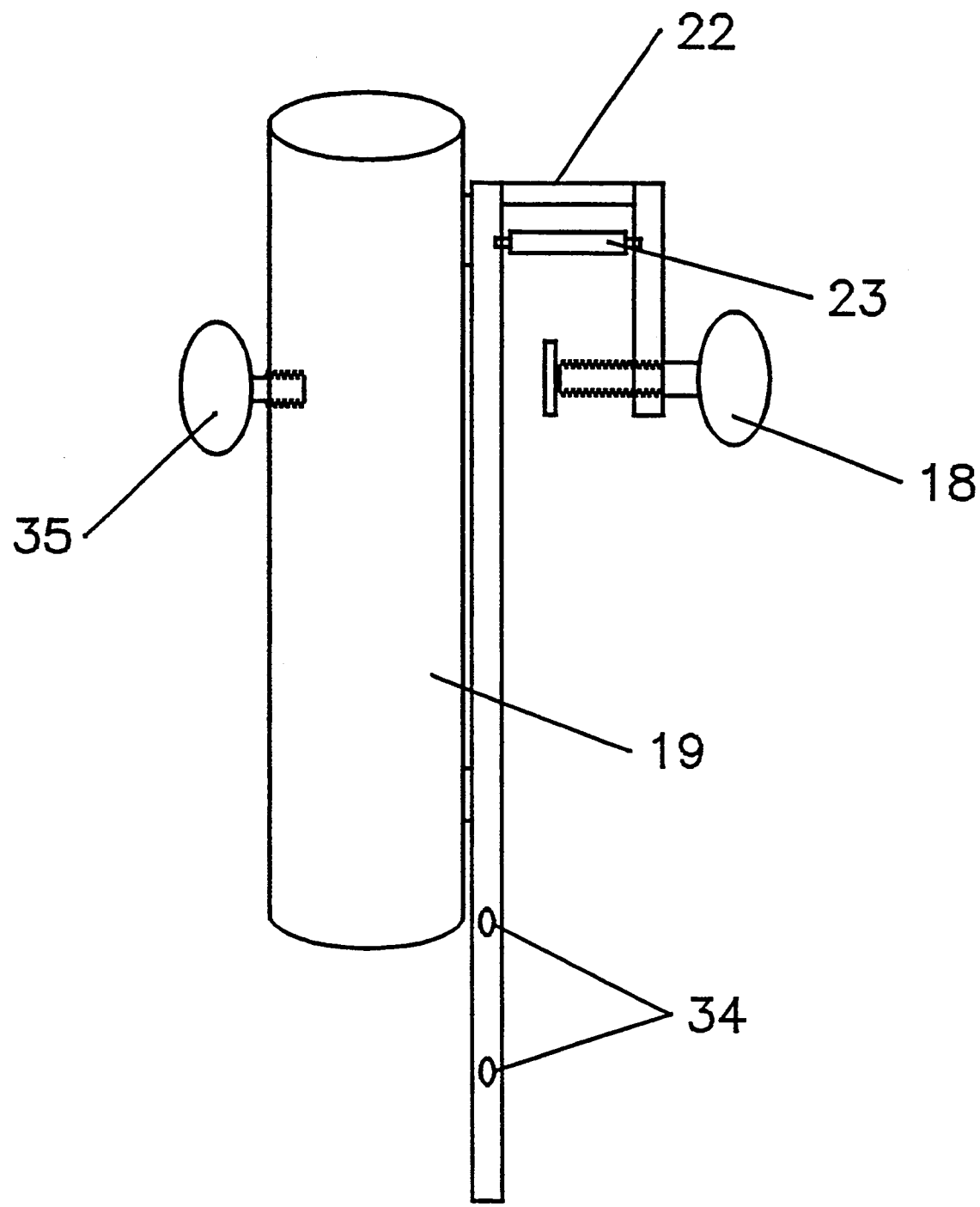
FIG. 4 shows a clamp to movable fasten to a fixed position rail; with the clamp attached to an open cylindrical holder sized to hold the cylindrical post which is attached to the positioning arm holder as shown in FIG. 3.

In FIG. 4 we show a U shaped clamp 22 preferably made of about ¼" thick steel with a shorter leg of the clamp having a locking screw with knob 18 to fasten clamp 22 to a metal or wooden rail. The longer leg of the U shaped clamp has an open inner cylindrical mounting cylinder 19 which may be rigidly attached thereto with bolts or by brazing or welding with welding being preferred. Hardened aluminum is the preferred construction material and it may be brazed to steel clamp 22. Although normally not needed, openings 34 are provided to allow fastening the lower end of the longer leg of U shaped clamp 22 to a structural support as may be installed in a vehicle or the side of a wooden deer blind. A minimum of two roller bearings 23 allow loosening of knob 18 in order that the clamp assembly 22 may be slidably moved.

Figure 5:
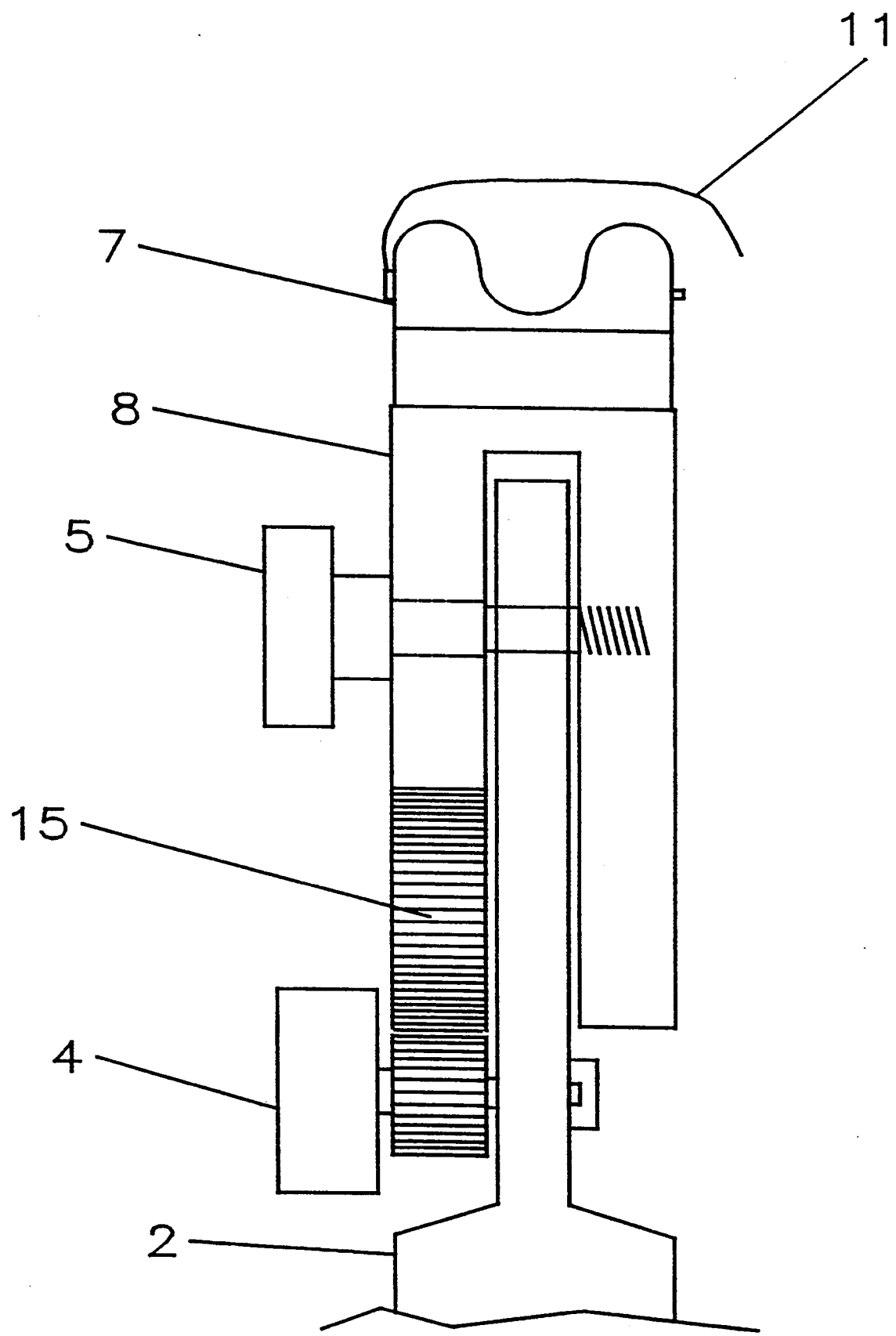
FIG. 5 shows detail of a pivotal connection and locking pin to allow adjustably fixing the rifle in a horizontal position.

In FIG. 5 we show a detail of one type of pivotal connection of mounting post 2 to the horizontal adjustment connector 8 which is attached to mounting beam 9. A flat upper end of mounting post 2 may be approximately ⅜" wide and 4" long with a top opening to admit locking pin 5 to hold post 2 pivotally connected to connector 8 which may be brazed, welded or screw mounted in the underside of mounting beam 9. A geared knob 4 is pivotally attached to mounting post 2 and positioned for the gears on knob 4 to engage gears 15 on the horizontal adjustment connector 8 to allow smooth adjustment of horizontal level of the rifle in mounting beam 9 Velcro TM tie-down straps 11 to hold a rifle in mounts 7 on mounting beam 9 are preferred but other fastening means would be suitable.

In FIG. 6 one preferred type of camera mount 21 is shown to allow removable and adjustable attachment to mounting beam 9 with a threaded locking screw 20. Camera 25 may attached in an adjustable fashion with a threaded bolt in knob 26 going through holder 21 into a threaded opening normally found in cameras for a tripod mount. Camera 25 could also be fastened to holder 21 with Velcro TM straps (not shown).

Figure 7:
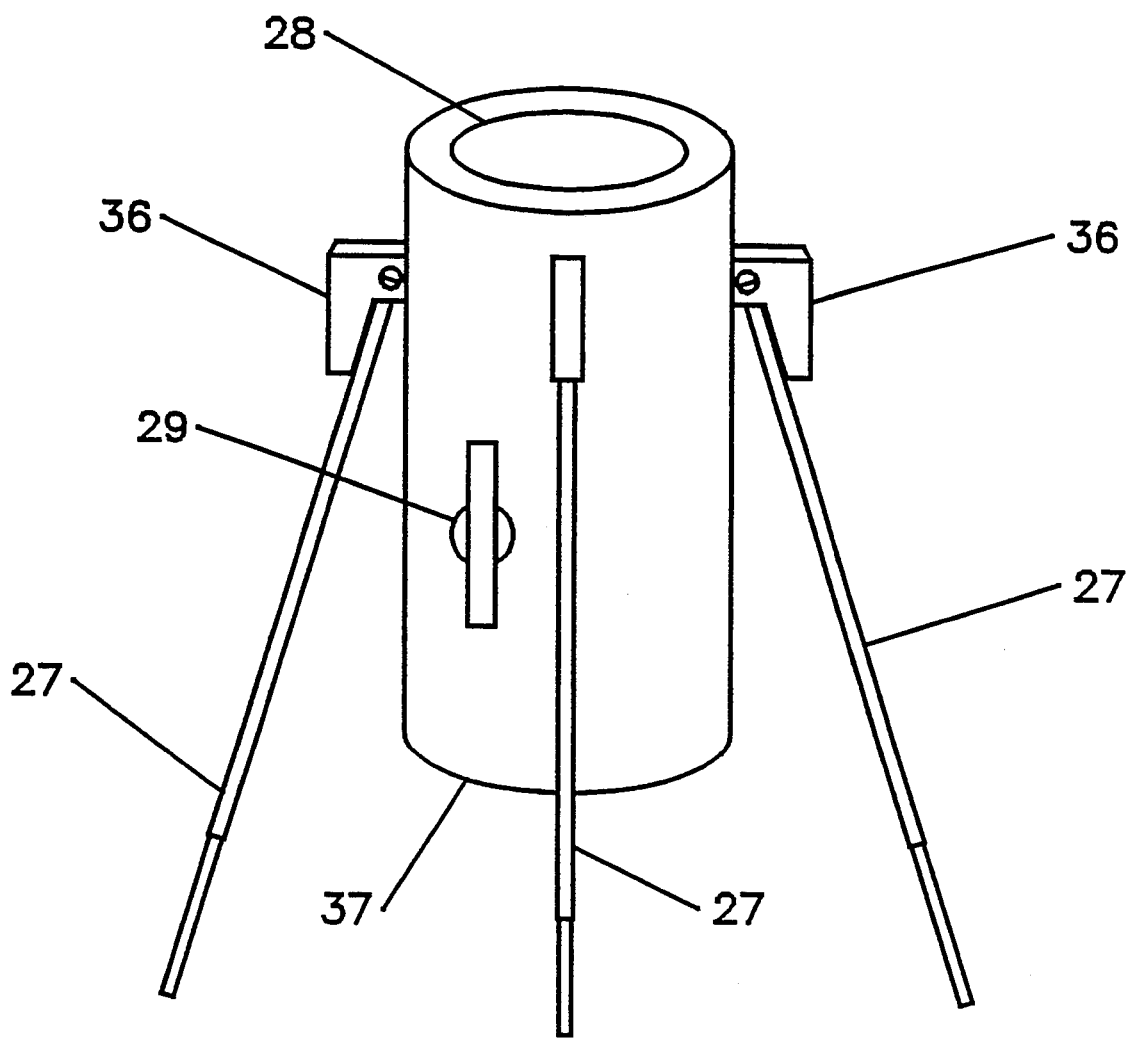
FIG. 7 shows a mounting base to hold the pivotally and vertically adjustable unit shown in FIG. 1 when a hunter is not hunting from a stand or vehicle.

In FIG. 7 we show a mounting unit 25 designed to be carried by a hunter in his pocket and set up when he wishes to hunt in a sitting position outside of a deer stand or vehicle. Unit 37 has an opening 28 to rotatably hold post 2, FIG. 1 and has three extensible legs 27 that may be carried folded together in a shortened position and are connected with connectors 26 to allow the legs 27 to be spread to a limited position. With the unit as shown in FIG. 1 slipped into unit 25 a hunter has a solid shooting position allowing a swinging and horizontal adjustment of mounting beam 9, FIG. 1.

In a second embodiment of the invention, cylindrical post 2 of FIG. 1 may be fitted into inner cylindrical holder 19 to give a simpler assembly useable in more limited space than the more complex assembly described under the preferred embodiment.

The above descriptions are of preferred embodiments but differing shapes, differing pieces and differing clamping means could be used to accomplish the major purpose of this design which may be described as holding a rifle and/or camera in a removable, fixed position with mechanism to:

1) allow a swinging motion about a pivot point;
2) allow a forward and backward motion;
3) allow a height adjustment to accommodate users of differing heights;
4) allow moving the pivot point thereby allowing a wider range of swinging motions;
5) allow horizontal adjustments with hand operated mechanisms;
6) to have available manually operable locking mechanism to hold the rifle and/or camera in a fixed position when the rifle is sighted on target. A minor purpose is to allow the user to carry a tripod mount to allow a swinging motion with horizontal adjustment using a removable portion of the mechanism as described in the drawings.

What is claimed is:

1. A multi-functional variable position rifle and camera mount comprising:
   a) a base plate clamp means and an inner cylindrical holder attached thereto;
   b) a threaded manually operable lock pin means in said inner cylindrical holder;
   c) a rifle mounting beam, a horizontal adjustment connector means and a cylindrical mounting post with said cylindrical mounting post pivotally attached to said horizontal adjustment connector means with said horizontal adjustment connector means attached to said rifle mounting beam and with said cylindrical mounting post sized to slidably fit into said inner cylindrical holder and to be movably and adjustably held at a vertical position using a threaded thumbscrew in a slidable collar on said cylindrical mounting post;
   d) a locking means in said horizontal adjustment connector means to allow manual locking of said horizontal adjustment connector means in a fixed position;
   e) a pair of rifle mounts and tie down means attached to said rifle mounting beam to allow fastening a rifle rigidly in said rifle mounts.

2. A multi-functional variable position rifle and camera mount as in claim 1 wherein said base plate clamp means comprises:
   a) a U shaped base with a manually operable means to fasten said clamp to a fixed rail in one leg and with said inner cylindrical holder rigidly attached in a second leg;
   b) dual roller means inside said U shaped base to allow said base clamp means to move smoothly on said rail with said manually operable fastening means allowing fastening said clamp means in a fixed position.

3. A multi-functional variable position rifle and camera mount comprising:
   a) a base plate clamp means and inner cylindrical holder attached thereto;
   b) a threaded manually operable lock pin means in said cylindrical holder;
   c) a T shaped swivel piece with a pivot post sized to fit movably in said inner cylindrical holder and an open positioning cylinder with guide pins through the side wall with said open positioning cylinder mounted at right angles to an upper end of said pivot post;
   c) an outer mounting cylinder with a manually operable locking screw rigidly attached at right angles to a slotted arm sized to movably slide into said open positioning cylinder with said slot sliding over said guide pins;
   d) a cylindrical post sized to fit movably into said outer mounting cylinder;
   e) a slidable collar means with a locking thumbscrew to fit over said cylindrical post and allow positional adjustment of said cylindrical post in said outer mounting cylinder;
   f) a horizontal adjustment connector means pivotally attached to a top end of said cylindrical post with a geared knob mounted to said cylindrical post and interacting with gear teeth on said connector means;
   g) a mounting beam means rigidly attached to said horizontal adjustment connector means;
   h) dual rifle mounts with means to removably hold a rifle in said dual mounts; said dual mounts being rigidly attached to said mounting beam means.

4. A multi-functional variable position rifle and camera mount comprising:
   a) a base plate clamp means and inner cylindrical holder attached thereto;
   b) a threaded manually operable lock pin means in said inner cylindrical holder;
   c) a T shaped swivel piece with a pivot post sized to fit movably in said inner cylindrical holder and an open positioning cylinder with guide pins through the side wall with said open positioning cylinder mounted at right angles to an upper end of said pivot post;
   c) an outer mounting cylinder with a manually operable locking screw rigidly attached at right angles to a slotted arm sized to movably slide into said open positioning cylinder with said slot sliding over said guide pins;
   d) a cylindrical post sized to fit movably into said outer mounting cylinder;
   e) a slidable collar means with a locking thumbscrew to fit over said cylindrical post and allow positional adjustment of said cylindrical post in said outer mounting cylinder;
   f) a horizontal adjustment connector means pivotally attached to a top end of said cylindrical post with a geared knob mounted to said cylindrical post and interacting with gear teeth on said connector means;
   g) a mounting beam means rigidly attached to said horizontal adjustment connector means;
   h) dual rifle mounts with means to removably hold a rifle in said dual mounts, said dual mounts being rigidly attached to said mounting beam means;
   i) a positionally adjustable camera mount attached to said mounting beam means.

5. A multi-functional variable position rifle and camera mount comprising:
   a) a mounting beam, a rifle mount means, and a positionally adjustable camera mount means; said rifle mount means being attached to said mounting beam and acting to rigidly but removably hold a rifle in said mount means and said camera mount means being attached to said mounting beam and acting to removably hold a camera in said positionally adjustable camera mount means;
   b) a cylindrical mounting post pivotally attached to said mounting beam;
   c) a horizontal adjustment means and a locking means to adjust and lock said cylindrical mounting post and said mounting beam in a fixed position relative to each other;
   d) a clamp, an outer mounting open cylinder with a side arm, a side arm holder attached to a cylindrical post, and an inner open mounting cylinder cooperating to make a fixed position swivel joint by sliding said cylindrical post attached to said arm holder into said inner open mounting cylinder and to make a moveable position outer swivel connection by sliding said cylindrical mounting post, which is pivotally attached to said mounting beam, into said outer mounting cylinder and sliding said arm into said side arm holder.

6. A multi-functional variable position rifle and camera mount as in claim 5 wherein said inner mounting open cylinder, said outer mounting cylinder and said side arm holder are each equipped with manually adjustable means to allow holding said mounting post in a fixed position in said outer mounting cylinder and to allow holding said arm in a fixed position in said side arm holder and to allow holding said cylindrical post attached to said side arm holder in a fixed position in said inner mounting open cylinder.

* * * * *